United States Patent [19]

Nakamura et al.

[11] 4,318,376
[45] Mar. 9, 1982

[54] COMBUSTION CHAMBER OF AN INTERNAL COMBUSTION ENGINE

[75] Inventors: Norihiko Nakamura, Mishima; Kiyoshi Nakanishi, Susono; Kazuhiko Itou, Toyota; Toyokazu Baika, Susono; Shuji Morita, Toyota, all of Japan

[73] Assignee: Toyota Jidosha Kogyo Kabushiki Kaisha, Toyota, Japan

[21] Appl. No.: 117,293

[22] Filed: Jan. 31, 1980

[30] Foreign Application Priority Data

Feb. 26, 1979 [JP] Japan .................................. 54-20716

[51] Int. Cl.³ .............................................. F02B 19/12
[52] U.S. Cl. ..................................... 123/260; 123/262; 123/270; 123/661
[58] Field of Search ............... 123/657, 661, 260, 262, 123/278, 270

[56] References Cited

U.S. PATENT DOCUMENTS

| 4,004,563 | 1/1977 | Nakamura et al. | 123/287 |
| 4,106,467 | 8/1978 | Tanahashi | 123/260 |
| 4,128,092 | 12/1978 | Yokota et al. | 123/287 |
| 4,147,150 | 4/1979 | Yokota et al. | 123/287 |
| 4,182,279 | 1/1980 | Sato et al. | 123/287 |

Primary Examiner—Craig R. Feinberg
Attorney, Agent, or Firm—Stevens, Davis, Miller & Mosher

[57] ABSTRACT

An internal combustion engine having an auxiliary combustion chamber connected to only the main combustion chamber via a connecting passage. The engine comprises a first raised portion formed on the inner wall of the cylinder head, a second raised portion formed on the top face of the piston at a position opposite to the first raised portion with respect to the axis of the piston, and a third raised portion formed on the inner wall of the cylinder head above the second raised portion. A first flat squish area is formed between the flat peripheral top face of the piston and the flat bottom face of the first raised portion. A second spherical shell shape squish area is formed between the spherical bottom wall of the third raised portion and the spherical rear face of the second raised portion. A recessed portion is formed on the top wall of the main combustion chamber at a position near the first raised portion. The open end of the connecting passage is arranged in the recessed portion. The spark plug is arranged within the recessed portion at a position near the open end of the connecting passage and outside of the extension of the connecting passage.

8 Claims, 5 Drawing Figures

COMBUSTION CHAMBER OF AN INTERNAL COMBUSTION ENGINE

DESCRIPTION OF THE INVENTION

The present invention relates to a construction of the combustion chamber of an internal combustion engine.

As a method of simultaneously reducing the amount of harmful HC, CO and $NO_x$ components in the exhaust gas, a method of using a lean air-fuel mixture has been known. In addition, as a method of reducing the amount of harmful $NO_x$ components in the exhaust gas, a method of using a mixture containing the recirculated exhaust gas therein has been known. However, there is a problem in that such a lean air-fuel mixture or a mixture containing the recirculated exhaust gas therein is inherently less easily ignited, and even if it is ignited, the flame speed of the mixture is very low and, therefore, the burning velocity is low. As an internal combustion engine capable of eliminating the above-mentioned problem, the inventor has proposed an internal combustion engine having an auxiliary combustion chamber connected to only a main combustion chamber via a connecting passage in which the spark plug is arranged. In this engine, the air-fuel mixture forced into the auxiliary combustion chamber from the main combustion chamber in the compression stroke is ignited and, then, the burning jet is injected into the main combustion chamber from the auxiliary combustion chamber. In this engine, it is true that, since the space around the electrodes of the spark plug is scavenged by the mixture flowing within the connecting passage in the compression stroke, ignition of the mixture is improved. In addition, it is also true that, since a turbulence is caused within the main combustion chamber by the burning jet injected from the auxiliary combustion chamber, the burning velocity is increased. However, it is difficult to cause a satisfactorily strong turbulence within the main combustion chamber and, therefore, it is difficult to increase the burning velocity to a satisfactory extent. In order to increase the burning velocity, the inventor has proposed an improved internal combustion engine in which a strong turbulence and a strong swirl motion rotating about a horizontal axis are caused within the main combustion chamber by the squish flow which is created at the end of the compression stroke. This improved engine, having an auxiliary combustion chamber connected to only the main combustion chamber via a connecting passage, comprises a first downwardly projecting raised portion formed on the periphery of the inner wall of the cylinder head and having a flat bottom face so as to form a first squish area between the flat bottom face of the first raised portion and a flat peripheral portion of the top face of the piston when the piston approaches the top dead center. In addition, this improved engine further comprises a second upwardly projecting raised portion formed on the top face of the piston at a position opposite to the flat peripheral portion of the top face of the piston with respect to the axis of the cylinder and having a rear face which has a complementary shape relative to the inner wall of the cylinder head, so as to form a second squish area between the inner wall of the cylinder head and the rear face of the second raised portion when the piston approaches the top dead center. In addition, in this improved engine, the second raised portion has an inclined front face which is exposed to the combustion chamber and smoothly connected to the flat peripheral portion of the piston. The combustible mixture forced into the auxiliary combustion chamber from the main combustion chamber via the connecting passage in the compression stroke is ignited by the spark plug arranged in the connecting passage and, then, the burning jet is injected from the connecting passage into the main combustion chamber. In this improved engine, since a strong turbulence and a strong swirl motion rotating about a horizontal axis are caused within the main combustion chamber by both the squish flow and the burning jet, the burning velocity is considerably increased.

However, in this improved engine, since the squish flow spouted from the second squish area directly flows into the connecting passage, the spark plug arranged in the connecting passage is directly exposed to the squish flow and, as a result, there is a danger that the flame of the mixture ignited by the spark plug will be extinguished by the squish flow and that, thus, a misfire will occur. In addition, since the spark plug is arranged in the connecting passage, the electrodes of the spark plug are exposed to the jet of flame spouted from the auxiliary combustion chamber into the main combustion chamber and, thus, carbons adhere onto the electrodes of the spark plug. As a result of this, since the electric current for ignition dissipates via the carbons, it is difficult to ensure a sufficient ignition energy and, thus, a problem occurs in that the output power of an engine is reduced.

An object of the present invention is to provide an internal combustion engine having an auxiliary combustion chamber, which is capable of preventing the flame of the mixture ignited by the spark plug from being extinguished and, also, preventing the electric current for ignition from dissipating.

According to the present invention, there is provided an internal combustion engine comprising: a cylinder block having a cylinder bore therein; a cylinder head mounted on said cylinder block and having a inner wall; a first raised portion having on its lower end a flat bottom face and being formed on the periphery of the inner wall of said cylinder head so as to project downwards; a piston reciprocally movable in said cylinder bore and having a top face which has a flat peripheral portion approachable to said flat bottom face so as to create a first squish area therebetween at the end of the compression stroke for spouting a first squish flow along the top face of said piston, the inner wall of said cylinder head and the top face of said piston defining a main combustion chamber therebetween; an intake valve movably mounted on said cylinder head for leading a combustible mixture into said main combustion chamber; an exhaust valve movably mounted on said cylinder head for discharging exhaust gas into the atmosphere; a second raised portion formed on the top face of said piston at a position opposite to said first raised portion with respect to an axis of said piston and having a rear face and a front face exposed to said main combustion chamber, said rear face having a complementary shape relative to the inner wall of said cylinder head and being approachable to the inner wall of said cylinder head so as to create a second squish area therebetween at the end of the compression stroke for spouting a second squish flow which moves forward in the upper interior of said main combustion chamber in the direction opposite to the spouting direction of said first squish flow, said first and second squish flows cooperating with each other to create a swirl motion rotating about a horizontal axis in said main combusiton chamber; a spark plug having a spark gap located in said main combusion chamber; an auxiliary combustion chamber formed in said cylinder head, and; a connecting passage formed in said cylinder head and interconnecting said auxiliary combustion chamber to said main combustion chamber, wherein the inner wall of said cylinder head has a recessed portion located near said first raised portion, said connecting passage having an open end located in said recessed portion, said spark plug being located within said recessed portion at a position near said open end and outside of an extension of said connecting passage.

The present invention may be more fully understood from the description of preferred embodiments of the invention set forth below, together with the accompanying drawings.

DESCRIPTION OF PREFERRED EMBODIMENTS

Figure 1:
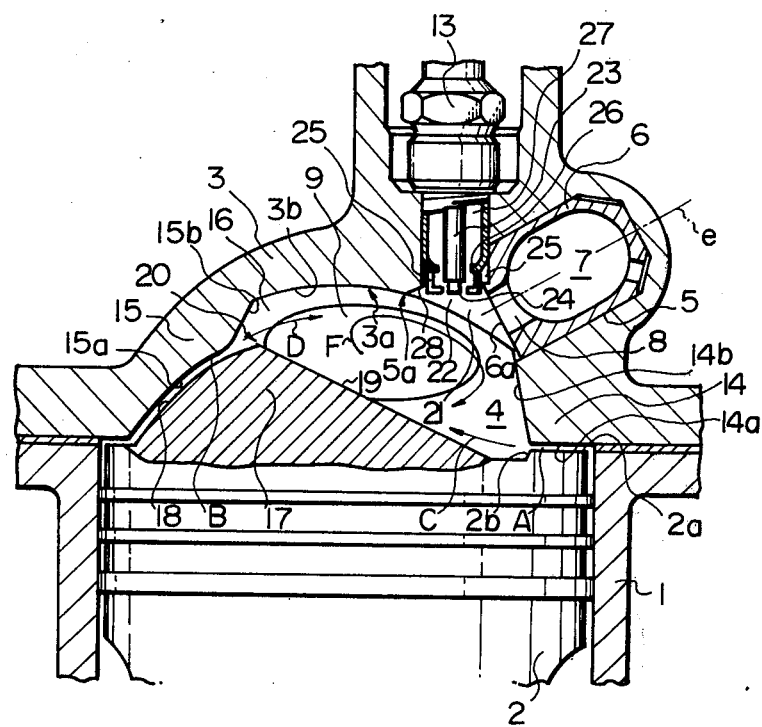
FIG. 1 is a cross-sectional side view of an embodiment of an internal combustion engine according to the present invention.
Figure 2:
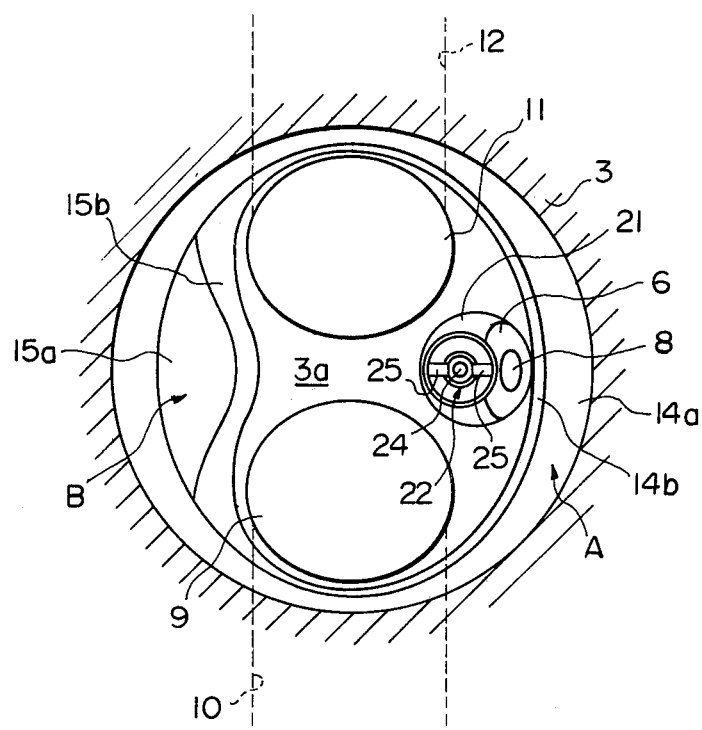
FIG. 2 is a bottom view of the cylinder head illustrated in FIG. 1.
Figure 3:
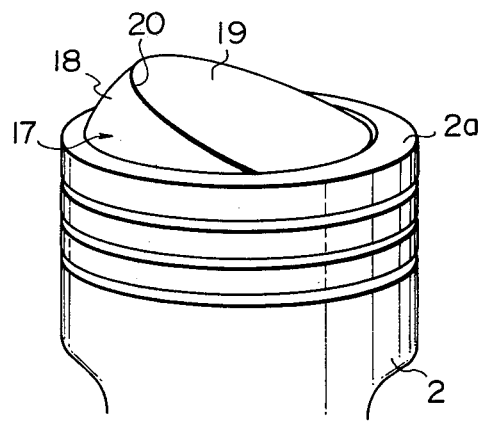
FIG. 3 is a perspective view of the piston illustrated in FIG. 1.

Referring to FIGS. 1 and 2, 1 designates a cylinder block, 2 a piston reciprocally movable in the cylinder block 1, 3 a cylinder head fixed onto the cylinder block 1, and 4 a main combustion chamber formed between the top face of the piston 2 and the inner wall 3a of the cylinder head 3. 5 designates a recess formed in the inner wall 3a of the cylinder head 3, 6 an auxiliary chamber component press-fitted into the recess 5, 7 an auxiliary combustion chamber formed in the auxiliary chamber component 6 and 8 a connecting passage formed in the auxiliary chamber component 6. 9 designates an intake valve, 10 an intake port, 11 an exhaust valve, 12 an exhaust port and 13a a spark plug.

As illustrated in FIG. 1, a downwardly projecting raised portion 14 is formed on a peripheral portion of the inner wall 3a of the cylinder head 3, and a downwardly projecting raised portion 15 is formed on the inner wall 3a of the cylinder head 3 at a position opposite to the raised portion 14 with respect to the axis of the piston 2. The raised portion 15 has a spherically shaped bottom wall 15a and a side wall 15b sharply rising from the inner end of the bottom wall 15a, and the side wall 15b is smoothly connected to the top wall 3b of the main combustion chamber 4. Consequently, a depression 16, extending from the side wall 15b of the raised portion 15 to the inner end 5a of the recess 5, is formed on the inner wall 3a of the cylinder head 3.

The raised portion 14 has a flat bottom wall 14a and a substantially vertically extending side wall 14b, and the top face of the piston 2 has a flat peripheral portion 2a arranged to face the flat bottom wall 14a of the raised portion 14, so that a flat squish area A is formed between the flat peripheral portion 2a of the piston 2 and the flat bottom wall 14a of the raised portion 14 when the piston 2 approaches the top dead center. In addition, a raised portion 17 is formed on the top face of the piston 2 at a position opposite to the flat peripheral portion 2a of the piston 2 with respect to the axis of the piston 2. The raised portion 17 has a spherically shaped rear face 18 having a complementary shape relative to the bottom wall 15a of the raised portion 15, so that a spherical shell shape squish area B is formed between the rear face 18 of te raised portion 17 and the bottom wall 15a of the raised portion 15 when the piston 2 approaches the top dead center. As illustrated in FIG. 1, a small step portion 2b arranged to align with the side wall 14b of the raised portion 14 is formed on the top face of the piston 2 at the inner end of the flat peripheral portion 2a of the piston 2, and the raised portion 17 has an inclined front face 19 exposed to the main combustion chamber 4 and smoothly extending from the small step portion 2b to a ridge 20 of the raised portion 17. When the piston 2 approaches the top dead center, a squish flow is spouted from the squish area A, as illustrated by the arrow C in FIG. 1, and at the same time, a squish flow is spouted from the squish area B towards the connecting passage 8, as illustrated by the arrow D in FIG. 1. As illustrated in FIG. 1, the recess 5 is so formed that an axis e thereof is inclined relative to the axis of the piston 2. The auxiliary chamber component 6 has a flat inner end wall 6a extending perpendicular to the axis e of the recess 5. Consequently, a recessed portion 21, defined by the cylindrical inner wall of the recess 5 and the flat inner end wall 6a of the auxiliary chamber component 6, is formed on the inner wall 3a of the cylinder head 3. Electrodes 22 of the spark plug 13 are arranged within the recessed portion 21 above the open end of the connecting passage 8, so that the jet of flame spouted from the auxiliary combustion chamber 7 into the main combustion chamber 4 via the connecting passage 8 does not directly impinge upon the electrodes 22 of the spark plug 13. In addition, the electrodes 22 of the spark plug 13 are arranged within the recessed portion 21 so that they are not directly exposed to the squish flow D spouted from the squish area B.

The spark plug 13 is a spark plug of a semi-creeping discharge type and comprises a central electrode 24 projecting from the tip of a cylindrical insulator 23, a pair of grounding electrodes 25, each facing the circumferential wall of the cylindrical insulator 24, and an annular end plate 26 forming the grounding electrodes 25 thereon and extending to a position located near the central insulator 23 and slightly spaced from the cylindrical insulator 23. On the other hand, the connecting passage 8 has a cylindrical inner wall having a uniform cross-section over the entire length thereof and has an open end directed to the front face 19 of the raised portion 17 of the piston 2. In addition, the connecting passage 8 is so formed that the axis thereof is arranged at a right angle relative to the flat inner end wall 6a of the auxiliary chamber component 6. Consequently, an angle between the inner wall of the connecting passage 8 and the flat inner end face 6a of the auxiliary chamber component 6 is approximately equal to a right angle. In addition, the peripheral edge of the open end of the connecting passage 8, which open end is located on the main combustion chamber side, is rounded, and the radius of the roundness of the peripheral edge is less than 0.5 mm, so that the jet of flame spouted from the connecting passage 8 into the main combustion chamber 4 does not spread transversely relative to the axis of the connecting passage 8.

Figure 4:
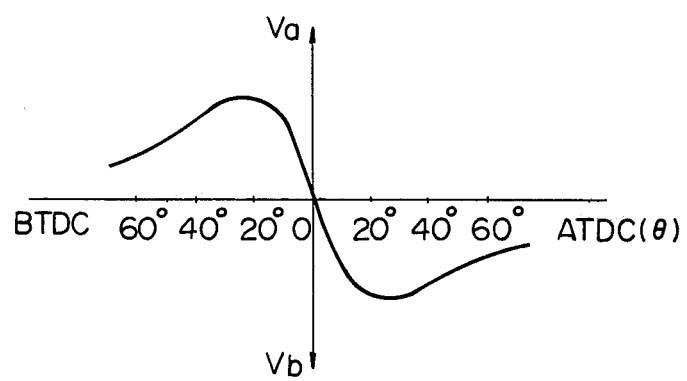
FIG. 4 is a graph showing change in the flow velocity of the squish flow.

FIG. 4 illustrates flow velocity of the gas flow, which is measured at a position near the ridge 20 (FIG. 1) of the raised portion 17 of the piston 2. In FIG. 4, the ordinate Va indicates flow velocity of the squish flow flowing in the direction D (FIG. 1), and the ordinate Vb indicates flow velocity of the gas flow in the direction opposite to the direction D (FIG. 1) towards the squish area B. In addition, in FIG. 4, the abscissa $\theta$ indicates crank angle. From FIG. 4, it will be understood that the spouting operation of the squish flow flowing in the direction D is started about 60 degrees before top dead center, and the flow velocity Va of this squish flow becomes maximum at about 20 degrees before top dead center.

During operation, at the time of the intake stroke, when the downward movement of the piston 2 is started, the pair of gas streams flowing towards the squish areas A and B at a high speed in directions which are opposite to those of the squish flows C and D, respectively, is created in the main combustion chamber 4 due to the temporary pressure drop within the squish areas A and B, and a strong turbulence is thus created in the main combustion chamber 4. As a result of this, the air-fuel ratio of a lean mixture or a mixture containing the recirculated exhaust gas therein in the main combustion chamber 4 becomes uniform over the entire region of the main combustion chamber 4. After this, when the compression stroke is started and, thus, the upward movement of the piston 2 is started, the residual exhaust gas remaining around the electrodes 24, 25 of the spark plug 13 is forced into the auxiliary combustion chamber 7 via the connecting passage 8, on one hand, and into an annular chamber 27 formed in the spark plug 13 via an annular gap between the cylindrical insulator 23 and the annular end plate 26 of the spark plug 13, on the other hand. As a result of this, the space around the electrodes 24, 25 is scavenged. After this, when the piston 2 further moves upwards and approaches the top dead center, the squish flows C and D are spouted from the squish areas A and B, respectively. Since the squish flow D spouted from the squish area B does not come into contact with the top face 3b of the main combustion chamber 4 and the front face 19 of the raised portion 17 of the piston 2, the squish flow D moves forward within the main combustion chamber 4 at a high speed. Then, a small part of the squish flow D enters into the connecting passage 8 and causes microturbulence within the connecting passage 8, and the remaining large part of the squish flow D flows downwards along the side wall 14b of the raised portion 14. On the other hand, after the squish flow C moves forward along the front face 19 of the raised portion 17 of the piston 2, the flow direction of the squish flow C is deflected by the squish flow D and, then, the squish flow C moves forward along the top face 3b of the main combustion chamber 4 towards the recessed portion 21. As a result of this, a strong swirl motion rotating about a horizontal axis, as illustrated by the arrow F in FIG. 1, is caused within the main combustion chamber 4. In addition, as illustrated in FIG. 1, since the inner wall of the recessed portion 21, which is located adjacent to the spark plug 13, is obliquely cut away, as designated by reference numeral 28, a part of the squish flow D is introduced into the space around the electrodes 24, 25 of the spark plug 13 along the cut away portion 28 and, thus, the space around the electrodes 24, 25 of the spark plug 13 is further scavenged. Then, the mixture is ignited by the spark plug 13. At this time, since the microturbulence is created within the connecting passage 8 as mentioned above, the flame of the mixture thus ignited rapidly propagates into the connecting passage 8 and rapidly spreads within the auxiliary combustion chamber 7. As a result of this, the mixture within the auxiliary combustion chamber 7 is rapidly burned and, thus, a strong burning jet is injected from the auxiliary combustion chamber 7 into the main combustion chamber 4 via the connecting passage 8. At this time, since the connecting passage 8 has a cylindrical inner wall having a uniform cross-section and, in addition, the roundness of the peripheral edge of the open end of the connecting passage 8 is extremely small, the burning jet is injected from the connecting passage 8 towards the front face 19 of the raised portion 17 of the piston 2 without spreading transversely relative to the moving direction of the burning jet.

As will be understood from FIG. 1, since the electrodes 24, 25 of the spark plug 13 are arranged outside of the flow path of the burning jet, the electrodes 24, 25 of the spark plug 13 are not directly exposed to the burning jet. Consequently, there is no danger that carbons will adhere onto the electrodes 24, 25 of the spark plug 13 and, thus, it is possible to ensure a satisfactory ignition energy.

Since the strong turbulence F is created within the main combustion chamber 4 when the jet of flame is injected from the connecting passage 8 into the main combustion chamber 4, the flame swirls in the main combustion chamber 4 together with the strong swirl motion F and the burning velocity is thus considerably increased. In addition, since the flame swirls in the main combustion chamber 4, unburnt HC and CO located in the quench layers formed on the inner wall of the cylinder head 3 and on the top face of the piston 2 are burned. After this, when the downward movement of the piston 2 is started, the burnt gas in the main combustion chamber 4 is sucked into the squish areas A and B together with the flame. As a result, the unburnt HC and CO located in the quench layers formed on the inner wall of the cylinder head 3 and on the top face of the piston 2 within the squish areas A and B are burned.

Figure 5:
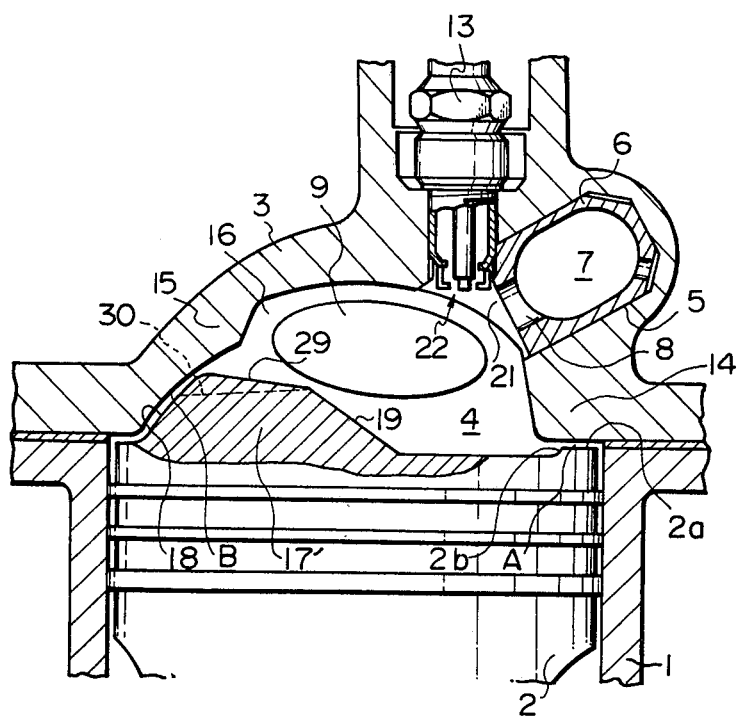
FIG. 5 is a cross-sectional side view of an alternative embodiment.

FIG. 5 illustrates an alternative embodiment according to the present invention. Referring to FIG. 5, a raised portion 17' formed on the top face of the piston 2 has a substantially flat top face 29, which is obtained by cutting away the top portion of the raised portion 17 illustrated in FIG. 1. In addition, in this embodiment, the small step portion 2b located at the inner end of the peripheral flat portion 2a of the piston 2 is arranged at a position remote from the center of the top face of the piston 2 as compared with the small step portion 2b illustrated in FIG. 1. In the embodiment illustrated in FIG. 5, since the flame is easily sucked into the squish areas A and B in the power stroke, the unburnt HC and CO located in the quench layers formed on the inner wall of the cylinder head 3 and on the top face of the piston 2 within the squish areas A and B are fully burned. In addition, instead of forming the top face 29 of the raised portion 17' as illustrated in FIG. 5, the top of the raised portion 17' may be cut away along the broken line 30 in FIG. 5. In this case, the flame is more easily sucked into the squish areas A and B.

According to the present invention, a strong swirl motion is created in the main combustion chamber by a pair of the squish flows, and the flame swirls within the main combustion chamber together with the strong swirl motion. In addition, a strong turbulence is caused within the main combustion chamber by the squish flows and the burning jet injected from the connecting passage. As a result of the creations of the swirl motion and the turbulence, since the flame rapidly spreads within the main combustion chamber, the burning velocity is increased and, thus, a stable combustion can be ensured. In addition, since a good scavenging operation of the space around the electrodes of the spark plug is ensured, and since the electrodes of the spark plug are not directly exposed to the squish flow, a stable ignition can be ensured. Furthermore, since the electrodes of the spark plug are not directly exposed to the burning jet injected from the connecting passage into the main combustion chamber, there is not danger that carbons will adhere onto the electrodes of the spark plug. As a result of this, a satisfactory ignition energy can be ensured. In addition, in the case wherein an air-fuel ratio of the mixture fed into the cylinders of the engine according to the present invention is approximately equal to the stoichiometric air-fuel ratio, even if the amount of recirculated exhaust gas is about 7 percent relative to the amount of the sucked gas fed into the cylinder, that is, even if the EGR rate is about 7 percent, a stable combustion can be ensured. On the other hand, in the case wherein an air-fuel ratio of the mixture fed into the cylinders of the engine according to the present invention is in the range of 13 through 14:1, even if the EGR rate is about 15 percent, a stable combustion can be ensured.

While the invention has been described with reference to specific embodiments chosen for purposes of illustration, it should be apparent that numerous modifications can be made thereto by those skilled in the art without departing from the spirit and scope of the invention.

What is claimed is:

1. An internal combustion engine comprising:
   a cylinder block having a cylinder bore therein;
   a cylinder head mounted on said cylinder block and having an inner wall;
   a first raised portion having on its lower end a substantially horizontal flat bottom face and having an approximately vertical side wall, said first raised portion being formed on the inner wall of said cylinder head so as to project downwards;
   a piston reciprocally movable in said cylinder bore and having a top face which has a flat peripheral portion approachable to said flat bottom face so as to create a first squish area therebetween at the end of the compression stroke for spouting a first squish flow along the top face of said piston, the inner wall of said cylinder head and the top face of said piston defining a main combustion chamber therebetween; said vertical sidewall of said first raised portion being exposed to said main combustion chamber, the inner wall of said cylinder head being shaped so that said main combustion chamber has a spherical top face;
   an intake valve movably mounted on said cylinder head for leading a combustible mixture into said main combustion chamber;
   an exhaust valve movably mounted on said cylinder head for discharging exhaust gas into the atmosphere;
   a second raised portion formed on the top face of said piston at a position opposite to said first raised portion with respect to an axis of said piston and having a rear face and a front face exposed to said main combustion chamber, said rear face having a complementary shape relative to the inner wall of said cylinder head and being approachable to the inner wall of said cylinder head so as to create a second squish area therebetween at the end of the compression stroke for spouting a second squish flow which moves forward in the upper interior of said main combustion chamber in the direction opposite to the spouting direction of said first squish flow, said first and second squish flows co-operating with each other to create a swirl motion rotating about a horizontal axis in said main combustion chamber;
   a recessed portion formed on said spherical top face of said main combustion chamber at a position adjacent to the sidewall of said first raised portion, defined by a substantially flat wall obliquely extending upwards from an upper end of the side wall of said first raised portion and by a substantially cylindrical wall inclined in the direction opposite to the direction towards which the flat wall of said recessed portion is inclined;
   an auxiliary combustion chamber formed in said cylinder head;
   a single, substantially straight-extending connecting passage formed in said cylinder head and interconnecting said auxiliary combustion chamber to said main combustion chamber, having an open end which is directly open to the main combustion chamber and arranged on the flat wall of said recessed portion, said connecting passage being arranged so that an axis thereof extends at a right angle relative to the flat wall of said recessed portion, the open end of said connecting passage having a rounded peripheral edge which has a roundness of a radius of less than 0.5 mm; and
   a spark plug located in the deep interior of said recessed portion at a position near said open end, having a spark gap located in said main combustion chamber and outside of an extension from said connecting passage.

2. An internal combustion engine as claimed in claim 1, wherein the open end of said connecting passage is arranged on an extension of said second squish area.

3. An internal combustion engine as claimed in claim 1, wherein the open end of said connecting passage is directed to the center of the front face of said second raised portion.

4. An internal combustion engine as claimed in claim 3, wherein said connecting passage has a uniform cross-section over the entire length thereof.

5. An internal combustion engine as claimed in claim 1, wherein said engine further comprises a third raised portion formed on the inner wall of said cylinder head above said second raised portion and having a bottom wall which cooperates with said rear face of said second raised portion for creating said second squish area therebetween, said third raised portion having a steeply inclined side wall which interconnects the bottom wall of said third raised portion to the inner wall of said cylinder head.

6. An internal combustion engine as claimed in claim 5, wherein said bottom wall of said third raised portion has a spherical shape, said rear face of said second raised portion having a shape which is complementary to the shape of said spherical bottom wall for creating a spherical shell shape squish area between said rear face and said spherical bottom wall.

7. An internal combustion engine as claimed in claim 5, wherein said second raised portion has a ridge which is approachable to the side wall of said third raised portion.

8. An internal combustion engine as claimed in claim 5, wherein said second raised portion has a substantially horizontally extending flat top face.

* * * * *